A. J. KLEIN.
NOSE GUARD FOR EYEGLASSES.
APPLICATION FILED MAY 24, 1912.

1,109,930.

Patented Sept. 8, 1914.

WITNESSES:
M. A. Johnson.
W. E. Morton.

INVENTOR
Augustus J. Klein,
BY Wm. H. Caulfield,
ATTORNEY

UNITED STATES PATENT OFFICE.

AUGUSTUS J. KLEIN, OF ORANGE, NEW JERSEY.

NOSE-GUARD FOR EYEGLASSES.

1,109,930.  Specification of Letters Patent. Patented Sept. 8, 1914.

Application filed May 24, 1912. Serial No. 699,598.

*To all whom it may concern:*

Be it known that I, AUGUSTUS J. KLEIN, a citizen of the United States, residing at Orange, in the county of Essex and State of New Jersey, have invented certain new and useful Improvements in Nose-Guards for Eyeglasses; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to an improved clip for eyeglasses which is designed to hold the eyeglasses securely on the nose of the wearer without very much pressure so that the nose is not pinched and the wearer is comfortable.

The invention consists of a clip formed into a cup-shape, the clip being adapted to hold by suction on the sides of the nose, the bridge of the eyeglass frame acting to hold the clips in proper position, and if necessary, giving just enough spring action to the clips to assist them in adhering to the nose.

The invention further consists in clips of this type which can be fastened to the bridge by screws and facing each other, but being pivotally attached so that they have a limited swinging movement to permit them to conform to the angle of the sides of the nose, thus making the bearing even for the entire face of the clip so that the clips will feel comfortable.

The invention is illustrated in the accompanying drawing, in which

Figure 1:
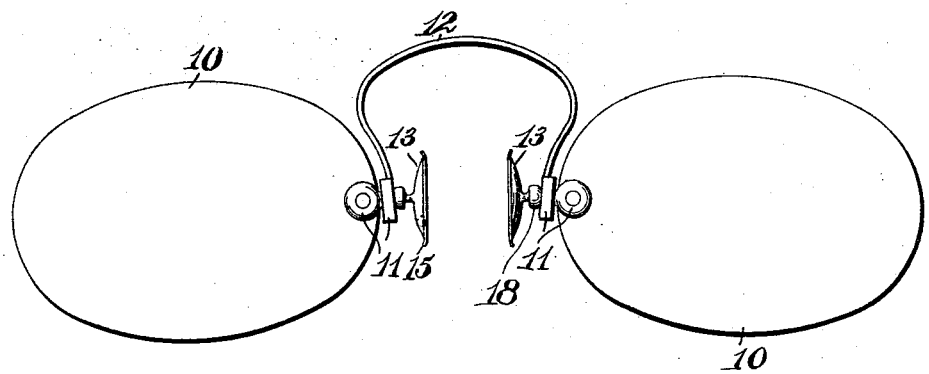
Figure 2:
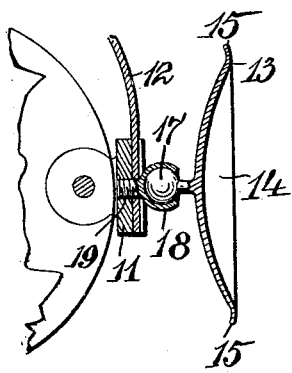

Figure 1 is a face view of a pair of eyeglasses equipped with my improved clips. Fig. 2 is an enlarged section through one of the clips.

In the drawing I show a pair of eyeglasses 10 which are provided with the lens-attaching devices 11 which can be of any usual type to grasp the lens and hold it, the lens-attaching devices being secured to the ends of the bridge 12. Attached to the ends of the bridge and on the inside thereof, and arranged so as to normally face each other, are the clips 13, which clips are made cup-shaped, that is, they are made with their opposed faces concave so as to form a chamber 14, and when the cup is placed against the skin on the sides of the nose it permits a slight vacuum in the clips, and the clips act so as to adhere slightly to the nose. The clips on their edges are preferably rounded as at 15 with a slightly outwardly curved edge. The clips are attached so that they have a slight rocking movement which can be supplied by any well known and preferred form of hinged or pivoted attachment, one form being shown in the drawings 2 in which the clip is provided on its back with a ball 17, which ball is secured in a socket 18, which socket is attached, by means of the screw 19 or other means, to the lens-attaching device 11, the screw 19 also passing through the end of the bridge 12 so as to secure the parts together. It will be understood that the bridge 12 can have a slight spring action to permit the clips being drawn apart to facilitate their being placed over the nose.

Having thus described my invention, what I claim is—

1. The combination of a pair of eyeglasses comprising a bridge and lens attaching devices at the ends of the bridge, with a pair of thin clips made with cup-shaped faces opposing each other, and means for fastening the clips on the bridge, the clips being made thinner at their edges, the edges being rounded and curved outward.

2. The combination of a pair of eyeglasses comprising a bridge and lens attaching devices at the ends of the bridge, with a pair of thin clips made with cup-shaped faces opposing each other, each clip being made of one piece of rigid material with a ball on the back and having its edge thinned, rounded and bent outward, and sockets secured on the bridge to receive the balls of the clips.

In testimony, that I claim the foregoing, I have hereunto set my hand this 20th day of May, 1912.

AUGUSTUS J. KLEIN.

Witnesses:
WM. H. CAMFIELD,
M. A. JOHNSON.

Copies of this patent may be obtained for five cents each, by addressing the "Commissioner of Patents, Washington, D. C."